United States Patent [19]

Cuer et al.

[11] 3,966,894

[45] June 29, 1976

[54] METHOD OF PREPARING BARIUM HYDROXIDE

[75] Inventors: Jean-Pierre Cuer, Colombes; Nicole Texier, Paris, both of France

[73] Assignee: Produits Chimiques Ugine Kuhlmann, Paris, France

[22] Filed: Sept. 16, 1974

[21] Appl. No.: 506,595

[30] Foreign Application Priority Data

Sept. 25, 1973 France .............................. 73.34249

[52] U.S. Cl. ............................... 423/638; 423/551; 423/563
[51] Int. Cl.² ......................................... C01F 11/10
[58] Field of Search ........... 423/157, 181, 635, 636, 423/641, 642, 563, 551; 210/38, 32

[56] References Cited
UNITED STATES PATENTS

3,316,171  4/1967  Mastrurilli ............................ 210/38
3,366,449  1/1968  Marshall et al. ...................... 423/642
3,514,266  5/1970  Nichols et al. ........................ 423/157

FOREIGN PATENTS OR APPLICATIONS

686,544   5/1964   Canada ............................... 423/635
555,043   3/1958   Canada ............................... 423/157
1,013,711  12/1965  United Kingdom ................. 423/635

*Primary Examiner*—Oscar R. Vertiz
*Assistant Examiner*—Wayne A. Langel
*Attorney, Agent, or Firm*—Pennie & Edmonds

[57] ABSTRACT

A water-insoluble exchange agent is used to remove barium from aqueous barium sulfide and then to release the barium to aqueous alkali, forming an aqueous solution from which there is crystallized substantially pure Ba(OH)$_2$, 8H$_2$O, particularly useful as an ingredient of "barium greases". The preferred exchange agent is di(2-ethylhexyl)phosphoric acid, which can be regenerated and recycled.

8 Claims, 1 Drawing Figure

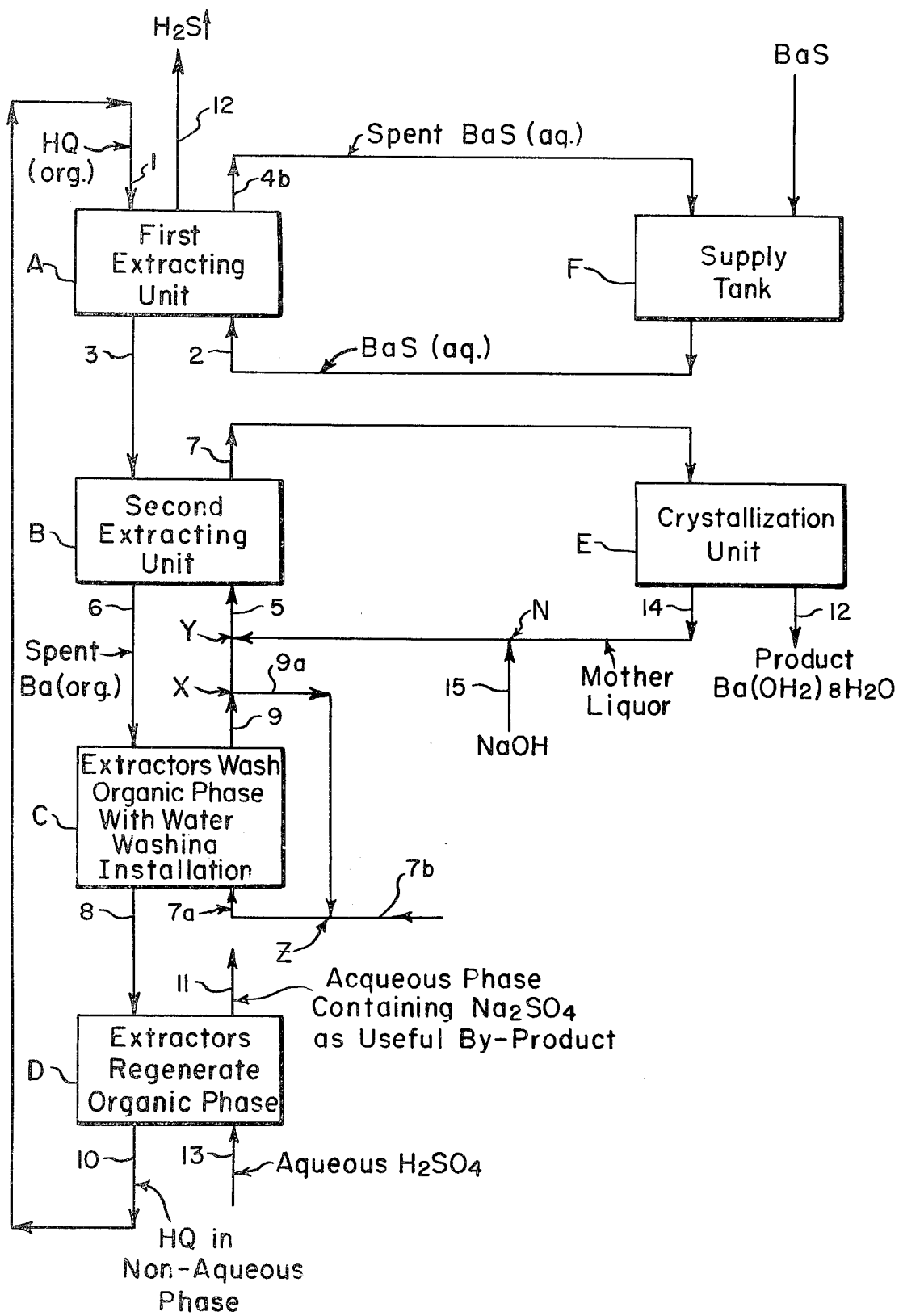

METHOD OF PREPARING BARIUM HYDROXIDE

BACKGROUND OF THE INVENTION

The present invention provides a method for preparing barium hydroxide, in particular its octahydrate, from barium sulfide and sodium hydroxide.

Barium hydroxide octahydrate, $Ba(OH)_2, 8H_2O$, has numerous industrial applications, especially in the field of lubricants.

Several methods of making this barium hydroxide are known, but they all have disadvantages. Thus, for example, barium sulfide can be carefully oxidized by air or oxygen but this method is encumbered by the simultaneous formation of barium sulfite.

Barium hydroxide octahydrate can be prepared on a laboratory scale by hydrolysis of tribarium silicate but that method is not practical on an industrial scale.

Barium hydroxide octahydrate is obtainable industrially by the reaction of sodium hydroxide with barium chloride dihydrate, but this method also is fraught with disadvantages. The barium chloride itself must first be prepared from barium sulfide and furthermore the octahydrate crystals finally obtained tend to occlude chloride which is difficult to eliminate by washing. In addition, the sodium chloride by-product of this process has low economic value.

SUMMARY OF THE INVENTION

A method has now been found whereby barium hydroxide octahydrate can be made from barium sulfide without first preparing barium chloride, thus avoiding the above-described disadvantages.

The present invention provides a method for obtaining from barium sulfide an aqueous solution of barium hydroxide from which a substantially pure grade of barium hydroxide octahydrate can be crystallized. The new method comprises steps of i. dissolving barium sulfide in water to form a first aqueous solution, i Contacting this first aqueous solution with a substantially water-insoluble acid exchange agent capable of exchanging its hydrogen ions for barium ions, allowing barium ions to be transferred from the aqueous solution to said agent and allowing the replaced hydrogen ions to react with sulfide to form hydrogen sulfide gas;

ii. separating the exchange agent containing barium from the residual first aqueous solution;

iii. contacting the separated exchange agent with a second aqueous solution containing an alkali metal hydroxide, allowing the barium ions to be transferred or stripped from the exchange agent to the second aqueous solution in exchange for alkali metal ions; and iv. separating the second aqueous solution containing barium hydroxide from the residual stripped, or spent exchange agent containing alkali metal ions.

The present invention includes also the obtainment of a substantially pure crystalline product of barium hydroxide octahydrate by crystallization from the aqueous barium hydroxide solution prepared by the method of this invention.

In a particularly preferred embodiment of the method of this invention, the exchange agent is used as a solution in a suitable substantially water-immiscible organic solvent.

The present invention furthermore provides several optional recycling steps which increase the overall efficiency of operation and achieve corresponding economies, namely:

I. The exchange agent functioning successively as barium acceptor and barium rejector can be regenerated and recirculated. Thus the "spent" agent of step (iv) above, either directly or in organic solvent as the case may be, can be contacted with exemplarily sulfuric acid to effect a replacement of the sodium ions in the agent by hydrogen ion and the agent (or its solution) can be recycled in its original acid form to step (i).

II. The residual first aqueous solution separated in step (ii) can be replenished with fresh barium sulfide and recirculated to setp (i). Thus the recycled BaS solution always contains a threshold amount of BaS which is not converted in the first exchange step and the amount of fresh BaS continuously or incrementally added thereto corresponds substantially to the amount which is being converted to $H_2S$ and barium adduct of the exchange agent.

III. The mother liquor from the crystallization can be replenished with additional alkali and recirculated to step (iii).

In a preferred embodiment of the method of this invention, all the steps of the method are carried out simultaneously and continuously, utilizing all the described recycling procedures.

DETAILED DESCRIPTION OF THE INVENTION

The exchange agent of this invention is any acid HQ which is substantially insoluble in water, particularly in water containing hydroxides, and which also has the property of readily exchanging its hydrogen ions or protons for barium ions. Thus when this acid HQ is placed into contact with an aqueous solution of barium sulfide, barium ions are transferred from the aqueous phase to the agent according to the following equations, the replaced hydrogen ions reacting with sulfide to form hydrogen sulfide gas, whose release helps to drive the exchange reaction forward:

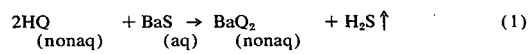

$$2HQ \quad + BaS \rightarrow BaQ_2 \quad + H_2S \uparrow \qquad (1)$$
$$(nonaq) \quad (aq) \quad (nonaq)$$

In this equation, the subscript (aq) designates the aqueous phase and (nonaq) designates the non-aqueous phase comprising either the exchange agent by itself or a solution thereof in a suitable solvent substantially not miscible with water.

In starting, BaS solution used for the method of this invention is made by simple addition of BaS to water or to the aqueous phase recovered from the extraction according to reaction (1) which contains a threshold concentration of unextracted BaS. The raw material for making these solutions can exemplarily be supplied by the well-known methods of reducing natural barium sulfate or barytes. Benefits of the present invention can be obtained with barium sulfide solutions varying widely in concentration, the efficiency being greater when the concentration is higher.

The relative amounts of aqueous BaS and non-aqueous exchange agent being contacted can be varied over a considerable range; however for greatest efficacy of barium transfer, it is preferable that the reactants be used in close to stoichiometric ratio so as to contact for example between about 0.8 and 1.2 moles of barium with every 2.0 moles of monovalent exchange acid.

After being separated from the aqueous solution containing a threshold unreacted amount of BaS, the non-aqueous phase comprising the barium adduct of the exchange agent is contacted with a second aqueous phase which contains a soluble hydroxide of an alkali metal. Thus, when the metal is sodium, the second exchange reaction which ensues is exemplarily $$BaQ_2 \text{(nonaq)} + 2NaOH \text{(aq)} \rightarrow Ba(OH)_2 \text{(aq)} + 2NaQ \text{(nonaq)} \quad (2)$$

The hydroxide concentration in the aqueous phase for carrying out equation (2) is in the range of about 4 to 10 normal, a concentration of about 6–8 normal being preferred.

Temperatures suitable for carrying out the reactions of equations (1) and (2) are between about 40° and 80°C., temperatures between about 50° and 60°C. being preferable.

To be again useable as exchange agent for barium, the alkali-metal cations in the "spent" (for stripped) non-aqueous phase are exchanged for hydrogen ions. To accomplish this, the non-aqueous solution is contacted with aqueous solution of a strong acid whereby the regenerating reaction takes place exemplarily as follows:

$$2NaQ \text{(nonaq)} + H_2SO_4 \text{(aq)} \rightarrow 2HQ \text{(nonaq)} + Na_2SO_4 \text{(aq)} \quad (3)$$

For the purposes of such regeneration, the acid solution can conveniently be an aqueous solution of up to about 5 normal sulfuric acid.

Substances which are particularly suitable as the exchange agent HQ of this invention are dialkyl phosphoric acids having the formula

wherein R and R' are the same or different and wherein each is any hydrocarbon radical, straight, branched or cyclic having about 6 to 12 carbon atoms. While some of the advantages of this invention can be obtained with such acids when R and/or R' contains less than 6 or more than 12 carbons, the lower members tend to make the agent less water - insoluble and the higher members tend to give the agent concomitant emulsifying properties which make necessary special precautions to attain clean separation of aqueous and non-aqueous phases. Exemplarily, R and R' can each be hexyl, cyclohexyl, 2-ethyl butyl, heptyl, 2 ethylhexyl, n-octyl, isooctyl, 3-methyl heptyl, 2,3-dimethylhexyl, 4-methylheptyl, 5-methylheptyl, nonyl, 2,2,3-trimethylpentyl, decyl, methylclyclopentyl, ethylcyclopentyl, methylcyclohexyl and lauryl. The preferred radical is 2 ethylhexyl and the preferred exchange agent is di(2-ethylhexyl) monohydrogen phosphate, i.e. di(2-ethylhexyl)phosphoric acid.

The exchange agent of this invention can be used as the sole component of the non-aqueous phase contacting first the aqueous barium sulfide phase and then the aqueous alkali phase. It is preferred, however, to dilute the exchange agent in an inert solvent which is immiscible in water. Such dilution renders the non-aqueous phase less viscous and permits more rapid diffusion in effecting the respective exchange reactions with aqueous phases.

When a dialkyl phosphoric acid is used as the exchange agent, solvents which are particularly useful as components of a diluent and which can be used singly or in admixture include saturated aliphatic hydrocarbons and aromatic hydrocarbons having a boiling point sufficiently high to limit their evaporation at the temperature of operation. Thus, substances which can function as such diluents include nonanes, decanes, undecanes, dodecanes, tridecanes, tetradecanes, pentadecanes, hexadecanes, heptadecanes, octadecanes, nonadecanes and the like as well as benzene, toluene, o-xylene, m-xylene, p-xylene, cumene and the like. A particularly suitable low-cost solvent for the non-aqueous phase of this invention is any commercial kerosene.

The concentration used of the exchange agent in non-aqueous solvent can vary over a wide range. Concentrations between about 0.2 and 1.0 molar are particularly suitable, concentrations from about 0.4 to 0.7 molar are preferred.

While benefits of this invention can be obtained using a solely hydrocarbon solvent for the exchange agent, it is preferred to include also a small amount of an alcohol additive to improve the solubility of the barium compound of the exchange agent. When a dialkyl phosphoric acid is used as exchange agent the highboiling monalcohols having 7 to 18 carbon atoms are particularly suitable for improving solubility of this exchange agent; those with 12 to 16 carbon atoms are most preferable. The alcohol additive can be straight-chained, cyclic or branched, and can be used singly or in mixtures. Suitable alcohols include exemplarily heptyl alcohol, 2-ethylhexylalcohol, octanols, isooctanols, methylcyclohexyl alcohol, nonyl alcohol, decyl alcohol, tridecyl alcohols, lauryl alcohol, pentadecyl alcohol, hexadecyl alcohols and the like. The alcohol additive can be used in amount of about 2 to 25% by weight of total solvent, preferably about 8 to 15%.

The present invention can be operated in any suitable equipment capable of carrying out the respective steps including dissolution, extraction, washing and crystallization. Each of the successive steps can be operated batchwise or as a continuous operation.

Thus when all the steps are carried out in separate batches, a certain amount of aqueous barium sulfide solution can first be equilibrated with a certain amount of an organic phase containing the extraction agent of this invention and the resultant organic phase now containing extracted barium can be separated and removed, exemplarily, to storage. Then in a separate operation, a certain amount at a time of this organic solution of barium can be reextracted by a certain amount of aqueous alkali and successive batches of aqueous barium hydroxide solution can be transferred to crystallization vessels.

It is preferred to carry out the method of this invention in a continuous manner.

DESCRIPTION OF THE DRAWING

A preferred embodiment of a continuous process according to the instant invention will now be described in detail with reference to the accompanying drawing which represents schematically a typical installation for the operation thereof.

An aqueous feed solution of barium sulfide and a nonaqueous extractant solution of this invention are delivered through pipes (2) and (1) respectively to a first extraction unit A maintained at suitable temperature and constructed so as to obtain good equilibrating contact between the two solutions and subsequently to obtain their efficient phase separation. The equipment of unit A can be an apparatus for liquid-liquid extraction of the type which accomplishes mixing and decanting at the same stage. Steps (i) and (ii) of the invention as defined above are thus both accomplished in a mixer settler. Hydrogen sulfide which is formed in the course of this first extraction is released through flue (12), and can be collected as a useful by-product.

After decantation, the raffiant or stripped, (spent) phase, from which all but a low threshold concentration of barium sulfide has been removed, is discharged via (4b) and returned to the dissolvingtank F where it is continuously replenished with fresh barium sulfide entering at (4a) to provide new feed liquor for cycling to the extraction unit.

Meanwhile the organic extractant phase, now enriched with barium, leaves through pipe (3) and enters the second extracting unit also maintained at a suitable temperature where the barium is extracted back into an aqueous phase by aqueous alkali entering through pipe (5).

Installation B exemplarily comprises a liquid-liquid extracting system of the mixer-settler type, exemplarily in three stages. Steps (iii) and (iv) of the invention as defined above are thus both accomplished with the equipment at B. The organic phase leaving B through pipe (6), containing some dissolved alkali, is washed at installation C by slightly alkaline water entering through pipe (7a). Installation C is set up as an extracting unit similar to Extractor A and functions substantially under the same conditions of temperature as A.

The aqueous phase from C leaves through pipe (9) and at X is partially recirculated through (9a) and partially sent back to the second extraction unit B, being joined at point Y with the aqueous alkali solution arriving through pipe (5). The fraction of aqueous phase being recirculated through (9a) is joined at 2 by additional water arriving through pipe (7b). One of the purposes of diluting the alkali in this manner is to avoid forming a stable emulsion between the organic and aqueous phases at unit C.

The washed organic phase proceeding from unit C is drawn through pipe (8) entering a regeneration unit D where it is treated with aqueous sulfuric acid arriving through pipe (13). The equipment of unit D again resembles that of unit A and functions under substantially the same temperature conditions.

The organic phase regenerated a unit D has a composition substantially the same as that initially used as extracting solution at unit A. It is therefore recycled through pipe (10) directly into pipe (1). The aqueous solution discharged at (11) contains traces of precipitated barium sulfate. The solution can be decanted from the precipitate and sodium sulfate can be recovered as a useful by-product.

The aqueous phase discharged from the second extracting unit B contains the main product desired and is sent through pipe (7) to crystallization unit E where cooling to a suitable temperature exemplarily at about 15°–25°C., results in crystallization of barium hydroxide octahydrate, which is then separated from the mother liquor and harvested at (14).

The mother liquor from the crystallization is recycled to the second extraction unit B after addition of alkali at N, said alkali being prepared by the dissolving of an appropriate amount of sodium hydroxide at an installation not shown in the drawing and arriving through pipe (15).

Compared to prior-art techniques for obtaining Ba-$(OH)_2$, $8H_{20}$, the method of the instant invention is particularly simple and advantageous. It can provide in continuous manner a product substantially free of impurities, and substantially without loss of the intermediate exchange agent. The by-products resulting from the process of this invention are hydrogen sulfide and sodium sulfate. Both have economic value and the hydrogen sulfide is obtained in a non-diluted form.

This invention will be further illustrated by description in connection with the following specific examples of the practice of it wherein, as also elsewhere herein, proportions are in parts by weight unless stated otherwise. It will be understood that it is intended to cover changes and modifications of these examples which do not constitute departures from the spirit and scope of the invention.

EXAMPLE 1

Into extractor A, maintained at a temperature of 60°C., there is introduced through pipe (2) 0.550 liters per hour of an aqueous barium sulfide solution corresponding to 32.1 grams per hour of BaS or 26.0 grams per hour of barium and containing also 2%, based on the weight of barium, of strontium in the form of strontium sulfide. There is simultaneously also introduced through pipe (1) 0.560 liters per hour of an exchange agent consisting of a solution of 0.50 moles/liter of di(2-ethylhexyl) phosphoric acid in a solvent having the composition 90% kerosene and 10% oxo $C_{13}$ alcohols mixture.

Through pipe (4b) extractor A delivers 0.510 liters per hour of a solution containing a low residual concentration of BaS namely about 7.4 grams/hr of BaS or 6.0 grams/hr of barium which is recycled to location F where the aqueous solution of BaS is prepared. The liberated hydrogen sulfide is removed through outlet (12).

The solution of exchange agent charged with barium is delivered to unit B for reextraction into aqueous phase in three countercurrent stages at a temperature of 60°C.

The barium is extracted by a 6 normal sodium hydroxide solution arriving at (5) at a rate of 1.43 liters per hour. This sodium hydroxide solution is obtained by the addition of 35.7% by weight of sodium hydroxide to the solution proceeding from the washing unit C, namely the mother liquor of the crystallization of Ba-$(OH)_2$, $8H_2O$, previously reheated to 60°C. and containing 1.66 grams/hour of Ba.

The organic phase leaving through (6) from the secondary extraction unit B contains 0.27 grams/hr barium not exttracted by the aqueous sodium extracted solution. This organic phase which contains a 0.033 normal concentration of dissolved NaOH is sent through (9) to the unit C for washing with water. The aqueous phase delivered through (9) from C has a NaOH concentration equal to 0.5 normal and is delivered at a rate of 0.5 liters/hour.

An organic phase (which has a further concentration of NaOH corresponding to 0.007 normal) is delivered from C through (8) and arrives at D for regeneration of the di(2-ethylhexyl) phosphoric acid, which is effected by a stream of one normal sulfuric acid at a rate of 0.6 liters/hr.

The pH of the aqueous solution of sodium sulfate formed is between about 2.5 and 2.8. The residual barium in this aqueous phase forms a precipitate of barium sulfate.

The organic phase leaving D through (10) contains regenerated di(2-ethylhexyl)phosphoric acid and is recycled through (1) to extractor unit (A).

The aqueous phase leaving B through (7) contains 21.4 grams per hour of barium and is sent to the crystallization unit E, where the yield of Ba(OH)$_2$, 8H$_2$O is 45.3 grams per hour corresponding to 19.7 grams per hour of barium. This yield corresponds to a 98.5% recovery of the barium extracted by the extraction solution at extractor A.

The strontium present in the original sulfide accompanies the barium throughout all the steps of the process up to and including the crystallization step, when it precipitates as Sr(OH)$_2$, 8H$_2$O while barium precipitates as Ba(OH)$_2$, 8H$_2$O. The composition of the crystallized product is found by analysis to be

```
Ba  = 37.8%
Na  = 0.47%
Sr  = 0.64%
S   = 322 ppm
```

EXAMPLE 2

Using the same apparatus described in example 1 there is introduced 0.525 liters per hour of a solution corresponding to 25.3 grams per hours of barium sulfide (20.5 grams of barium) and 0.510 liters per hour of an organic phase 0.455 molar in di(2-ethylhexyl) phosphoric acid in the same kerosene-C$_{13}$ alcohols diluent as used in example 1.

Through pipe (4) there is delivered 0.510 liters per hour of a supply of 5.7 grams per hour of barium sulfide (4.65 grams per hour of barium).

The organic phase charged with barium exits from A through pipe (3) and is sent through the battery B where it is treated under the same conditions as example 1 with regard to the concentration of sodium hydroxide and the charge of mother liquor of the crystallization of barium hydroxide.

The mother liquor is replenished with sodium hydroxide up to a concentration of 7.6 normal and is supplied at the rate of 1.520 liters per hour corresponding to 3.13 grams per hour of barium.

The organic phase leaving B through pipe (6) containing 0.21 grams per hour of barium and is treated in the same way as in example 1 before being recycled to the extraction battery A. Its concentration of dissolved sodium hydroxide is between 0.033 normal and 0.008 normal.

The aqueous phase leaving B through pipe (7) containing 21.1 grams per hour of barium is sent to the centrifugal crystallizing equipment where there is obtained 43.4 grams of the octahydrate of barium hydroxide per hour, corresponding to 18.9 grams per hour of barium.

The yield of barium hydroxide octahydrate obtained is 98.5% of the theorectical amount calculated on the basis of the barium extracted by the organic phase. The crystallized product has the following composition:

```
Ba  = 37.1%
Na  = 0.408%
Sr  = 0.59%
S   = 25 ppm
```

EXAMPLE 3

Using the same apparatus as described in example 1 and carrying out the respective steps under the same conditions there is introduced 0.580 liters per hour of a solution corresponding to 28.6 grams per hour of barium sulfide (23.2 grams per hour) and 0.250 liters per hours of an organic phase containing 1.03 molar di(2-ethylhexyl) in the same solvent system as used in example 1.

Through pipe (4), 0.510 liters per hour of raw barium sulfide solution is supplied. This solution delivers 5.8 grams per hour of barium sulfide (4.1 grams per hour of barium).

The organic phase after extracting barium leaves A through pipe (3) and is sent to the battery B where it is treated under the same conditions as in example 1. The barium is extracted by 1 liter per hour of the mother liquor from the crystallization replenished with sodium hydroxide to a concentration of 6.15 normal corresponding to 5.1 grams per hour of barium.

The organic phase leaving B through pipe (6) containing 0.49 grams per hour of barium is treated in C by 0.290 liters per hour of 0.5 normal sodium hydroxide. Its concentration of dissolved sodium hydroxide changes from 0.084 normal and 0.012 normal while the extracting agent is being regenerated in D by the sulfuric acid.

The aqueous phase leaving B through pipe (7) containing 23.1 grams per hour of barium is cooled. The octahydrate of barium hydroxide is separated from the crystallized mother liquor and there is thereby obtained 53.2 grams per hour of Ba(OH)$_2$, 8H$_2$O (23.1 grams per hour of barium) which corresponds to a yield in the reextraction unit B of 97% with respect to the barium extracted by the orgaic phase.

We claim:
1. A method for obtaining an aqueous solution of barium hydroxide from barium sulfide comprising the steps of
   i. contacting an aqueous barium sulfide solution containing barium ions and sulfide ions with a substantially water-insoluble exchange agent containing hydrogen ions, and which is capable of exchanging the hydrogen ions for barium ions, said exchange agent being a dialkyl phosphoric acid having the formula

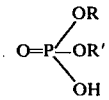

R and R' being the same or different straight, branched or cyclic hydrocarbon radical having 6 to 12 carbon atoms, effecting the transfer of barium ions from the aqueous solution to said agent and simultaneously effecting the reaction of the exchanged hydrogen ions with sulfide ions to form hydrogen sulfide gas;
   ii. separating the exchange agent containing barium ions from the residual aqueous solution;

iii. contacting the separated exchange agent containing barium ions with an aqueous alkali metal hydroxide solution containing alkali metal ions and hydroxide ions, effecting the transfer of barium ions to the aqueous solution in exchange for alkali metal ions and forming an aqueous solution of barium hydroxide;

iv. separating the aqueous solution of barium hydroxide from the exchange agent containing alkali metal ions.

2. The method of claim 1 wherein the exchange agent is di(2-ethylhexyl)phosphoric acid.

3. The method of claim 1 wherein the exchange agent is dissolved in an inert solvent which is substantially immiscible in water.

4. The method of claim 3 wherein the inert solvent is kerosene.

5. The method of claim 3 wherein the inert solvent contains about 2 to 25% of an alcohol having 7 to 18 carbon atoms.

6. The method of claim 1 which in addition comprises contacting the exchange agent obtained in step iv, containing alkali-metal ions, with an aqueous solution of a strong acid, effecting the exchange of hydrogen ions and alkali-metal ions between agent and aqueous phases, and separating the phases to leave (a) the exchange agent in regenerated acid form and (b) an aqueous solution containing an alkali-metal salt of the strong acid.

7. The method of claim 6 wherein the alkali-metal ion is sodium ion and the strong acid is sulfuric acid and wherein the resultant sodium sulfate is recovered from the aqueous solution as a by-product.

8. The method of claim 1 in which the aqueous solution of barium hydroxide obtained in step iv is crystallized and a crystalline product comprising the octahydrate, $Ba(OH)_2, 8H_2O$ is separated therefrom.

* * * * *